United States Patent [19]

Sullins

[11] 3,976,575

[45] Aug. 24, 1976

[54] LIQUID AERATION DEVICE

[75] Inventor: John K. Sullins, Kingsport, Tenn.

[73] Assignee: Canton Textile Mills, Inc., Canton, Ga.

[22] Filed: July 28, 1975

[21] Appl. No.: 599,876

[52] U.S. Cl. .............................. 210/220; 210/255; 261/125; 261/DIG. 75
[51] Int. Cl.² ..................... C02B 1/34; B01F 3/04
[58] Field of Search ............ 210/15, 63, 198 R, 205, 210/220, 221 R, 255; 261/119 R, 125, DIG. 75

[56] References Cited
UNITED STATES PATENTS

| | | | |
|---|---|---|---|
| 543,410 | 7/1895 | Taylor | 261/DIG. 75 |
| 543,411 | 7/1895 | Taylor | 261/DIG. 75 |
| 895,229 | 8/1908 | Beddoes | 210/15 |
| 996,560 | 6/1911 | Bradley | 210/63 X |
| 1,594,947 | 8/1926 | Hartman et al. | 261/125 X |
| 3,643,403 | 2/1972 | Speece | 261/DIG. 75 |
| 3,826,742 | 7/1974 | Kirk et al. | 210/63 |
| 3,840,216 | 10/1974 | Smith et al. | 210/63 X |
| 3,882,017 | 5/1975 | Wittrup | 210/63 X |

Primary Examiner—Charles N. Hart
Assistant Examiner—Robert H. Spitzer
Attorney, Agent, or Firm—Walter M. Rodgers; Walter A. Rodgers

[57] ABSTRACT

A liquid aeration device includes a head box having a bottom wall, a pair of spaced side walls interconnected with the bottom wall, and a pair of spaced transverse walls interconnected with the side and bottom walls to form a receiver chamber into which liquid to be aerated is fed and from which such liquid passes through orifice means formed in one transverse wall of the head box from whence the liquid by free fall passes through an entry chamber and enters a vertically disposed downcomer conduit interconnected at its bottom with a pressure chamber to which a vertically disposed riser conduit is also connected. A third transverse wall is interconnected with the side walls and spaced downstream somewhat from the transverse wall in which the orifice means is formed and since the head box is of the open top type, an excess of liquid which overflows the transverse wall having the orifice means is allowed to overflow the third transverse wall and to fall by free fall downwardly through the space adjacent the upper end of the riser conduit. If desired a second or more phases may be used and which would include the above described components.

12 Claims, 4 Drawing Figures

LIQUID AERATION DEVICE

Under normal ambient conditions, maximum solubility of oxygen in water is in the range of 8 milligrams per liter. Solubility increases with a reduction of temperature and vice versa. Some marine life can exist in water containing oxygen as low as 1 milligram per liter but most marine creatures require a minimum oxygen content of 3 milligrams per liter or higher while some types of fish require 6 milligrams per liter in order to survive. In the process of oxidizing oxygen demanding waste, oxygen is consumed. If the oxygen content of treated liquid in the form of biological or industrial effluents is sufficiently low, the discharge of such liquids into streams and lakes can result in a lowering of the water oxygen content to dangerously low concentrations sufficiently low to destroy marine life.

Regulatory agencies in some instances require a treatment plant not only to remove oxygen demand to very low levels but also to require that the effluent be aerated to minimum levels of three and sometimes to as much as five milligrams per liter of dissolved oxygen.

Henry's law states that the quantity of gas dissolved in a given quantity of solution is proportional to its partial pressure over the solution in terms of mol fraction of the gas in solution.

It is well known that the difficulty in forcing oxygen into solution increases as the degree of saturation increases and a diffusion rate of a gas from a gaseous phase into a liquid phase is directly proportional to the surface area of the liquid phase. It is on this principle that conventional aeration systems operate. By means of surface aerators, agitators are designed to attain maximum cavitation by means of pumping. Diffused air aeration diffusers of known design tend to produce minimum size air bubbles but do so with substantial power consumption.

According to this invention, aeration is achieved at little or no power cost by utilizing high area gas liquid interfaces and the principles of Henry's law, all operating under controlled time conditions. More specifically a head box having an inlet and an orifice type outlet for reducing the liquid pressure according to venturi principles exhausts liquid to be aerated by free fall through an entry chamber and into the upper end of a vertically disposed downcomer tube the lower end of which is interconnected with a pressure chamber. A riser tube is interconnected with the pressure chamber and is vertically disposed with its upper end at a level below the upper end of the downcomer tube. Thus liquid is aerated due to the venturi action of the orifice and further intermingling of air and the liquid occurs during free fall from the orifice into the downcomer in which the velocity of movement of liquid downwardly is at least as great as the tendency of air bubbles to rise so that maximum efficiency of intermingling between liquid and air is achieved. Furthermore pressure due to the head in the downcomer and riser tubes is brought to bear in the pressure chamber and this action according to Henry's law tends to increase the degree of aeration. Preferably a wall is provided which is spaced downstream from the wall in which the orifice means is formed and together with the orifice wall forms an entry chamber disposed immediately above the downcomer tube. If the inflow of liquid to be aerated is greater than that which passes downwardly through the downcomer tube, the excess may overflow from the entry chamber and fall by free downwardly to the upper or exhaust end of the riser conduit. If desired, two or more phases may be employed in series which are similar to that described so as to repeat the aeration cycle at least once.

For a better understanding of the invention, reference may be had to the following detailed description taken in conjunction with the accompanying drawings in which FIG. 1 is an isometric view of two stage aeration device constructed according to this invention;

FIG. 3 is a cross-sectional view taken along the line designated 3—3 in FIG. 1; and in which FIG. 4 is a fragmentary cross-sectional view taken along the line designated 4—4 in FIG. 1.

Figures 3, 4:
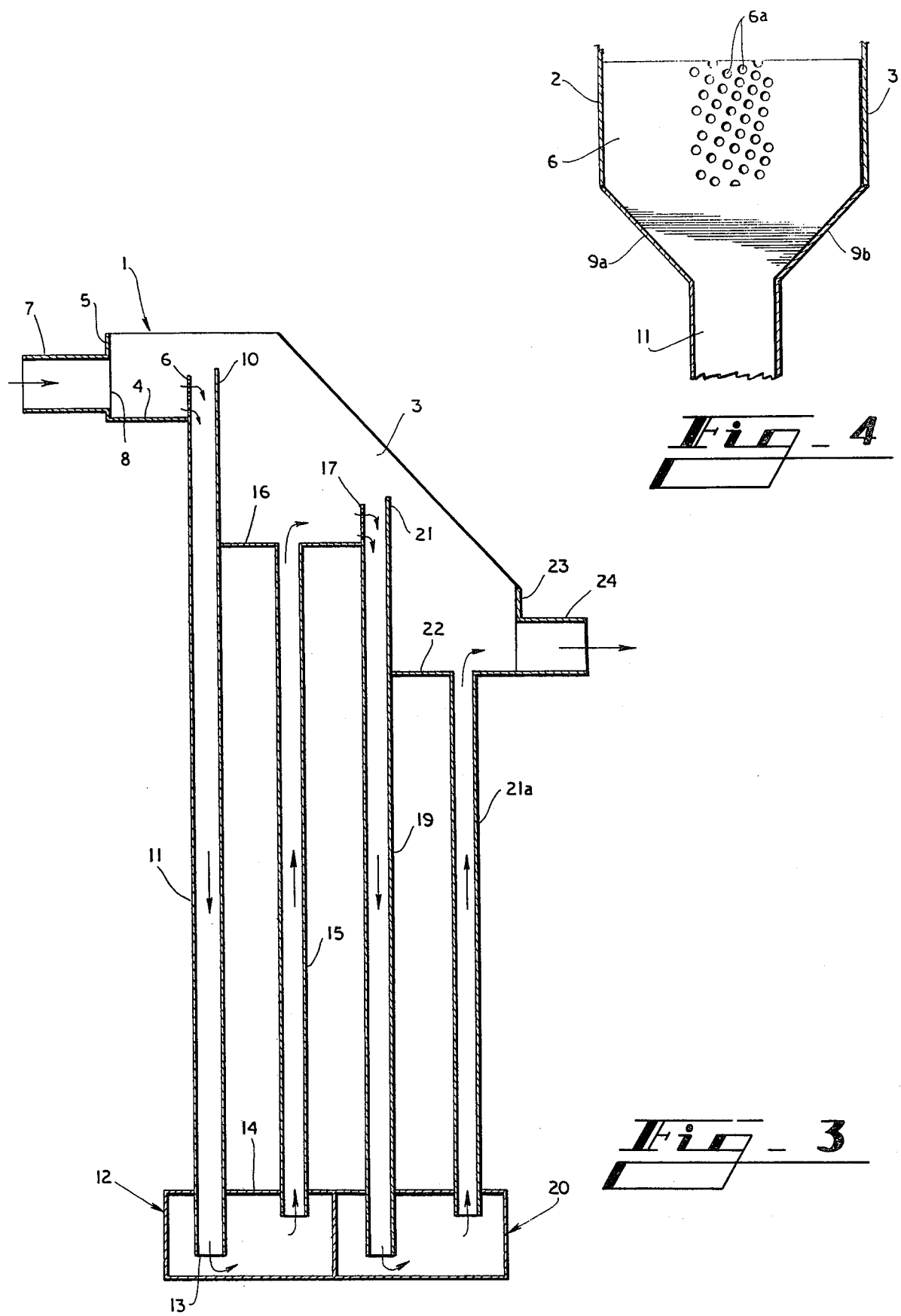

In the drawings the numeral 1 generally designates a head box while the numerals 2 and 3 designate side walls of the head box which as is obvious are of stepped configuration along their lower edges. A bottom wall 4 is interconnected along its side edges with the side walls 2 and 3 and a pair of transverse walls 5 and 6 are interconnected along their end edges to the side walls 2 and 3 and to the bottom wall 4 to form a receiver chamber. An entry conduit 7 and aperture 8 formed in wall 5 serve to deliver liquid to be aerated to the receiver chamber. At least one and preferably a plurality of orifices generally designated by the numeral 6a and as best shown in FIG. 4 are formed in transverse wall 6 and allow liquid to be aerated to flow from the receiver chamber. Orifices 6a may be round as shown or may be of any other desired configuration such as square, rectangular or may be of irregular configuration. As shown in FIG. 4 the orifice means 6a is configured so that its width is about equal to the width of downcomer conduit 11. The invention is not limited to this particular configuration, however. Passage of liquid through these orifices causes a reduction in pressure of the liquid by venturi principles and thus tends to cause atmospheric air to dissolve into the liquid at this point.

Figure 1:
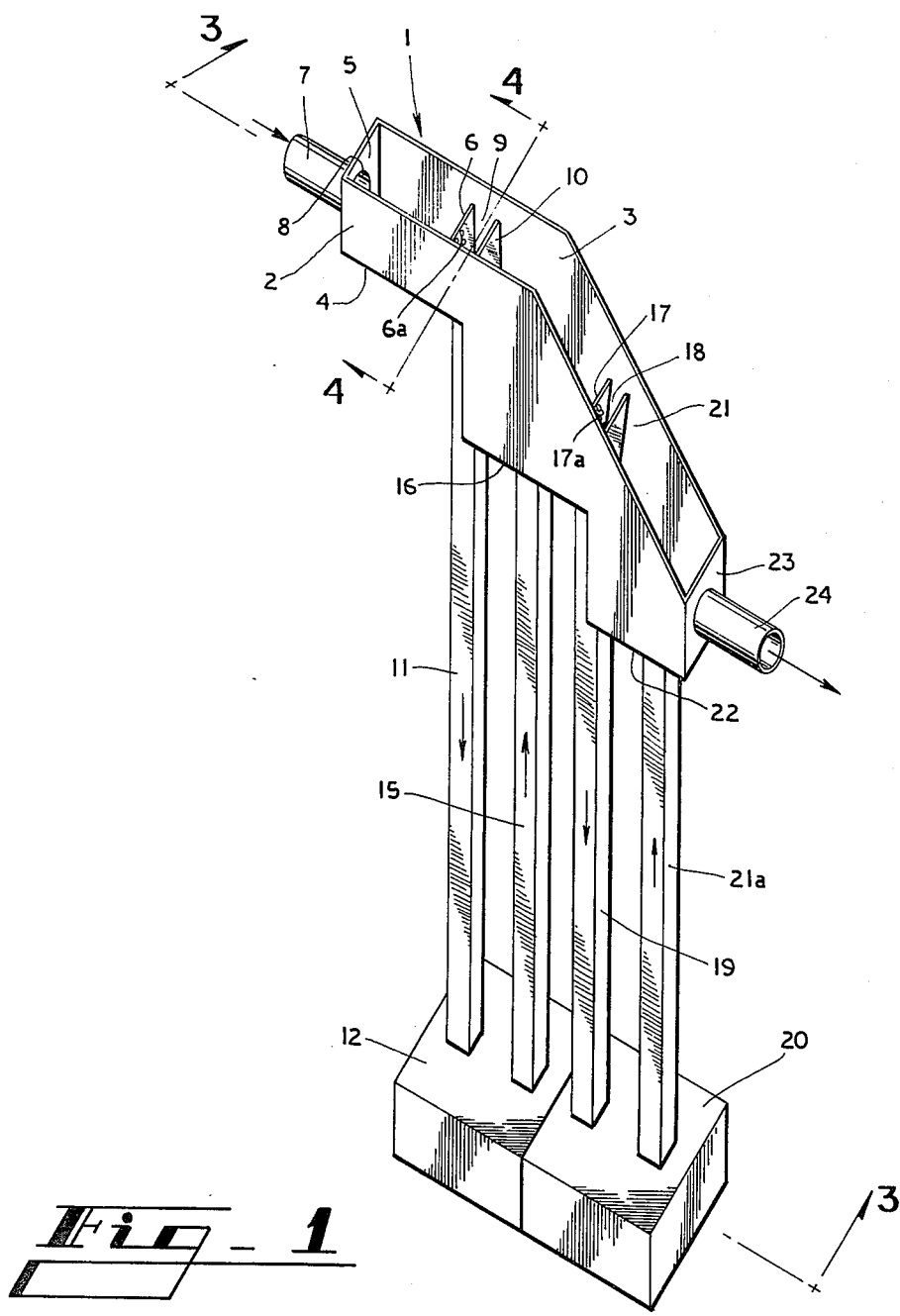
Figure 2:
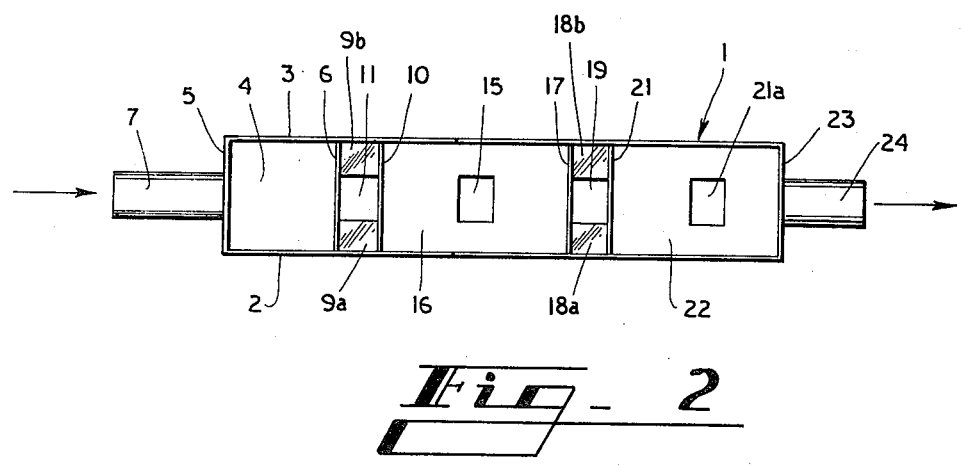
FIG. 2 is a plan view from above of the head box shown in FIG. 1.

Liquid having passed through the orifices 6a may then fall freely through an entry chamber 9 disposed between side walls 2 and 3 and between transverse wall 6 and a third transverse wall 10 and having downwardly and inwardly sloping bottom panels 9a 9b. Transverse wall 10, as is apparent from FIGS. 1 and 2, is disposed downstream from the transverse wall 6 and is arranged so that the entry chamber 9 between walls 2, 3, 6 and 10 is immediately above bottom panels 9a and 9b and vertical downcomer tube 11 which communicates with a pressure chamber 12 at its lower end. Since the head which is effective to cause liquid to flow through orifice means 6a is less than that which causes flow in downcomer tube 11, the total cross-sectional area of orifice means 6 preferably is greater than that of tube 11.

Downcomer conduit 11 is of such cross section as to accommodate downward movement of liquid at a velocity which is as great as or greater than the velocity at which air bubbles tend to rise in downcomer tube 11 thus to insure maximum efficiency of intermingling of atmospheric air and downwardly moving liquid in downcomer conduit 11. Ordinarily this velocity should be in an apparent range of four-tenths to six-tenths of a foot per second. The lower end 13 of downcomer tube 11 extends somewhat below the top 14 of pressure chamber 12 so that any air which is carried downwardly into the pressure chamber 12 tends to be trapped in the upper portion of that chamber rather than to escape upwardly through riser conduit 15 which is vertically disposed and interconnected at its lower end with the pressure chamber 12, the lower end of conduit 15 also protruding somewhat below the top wall 14 of pressure chamber 12. The upper end of riser conduits 15 discharges liquid into a second receiver chamber comprising second bottom wall 16 which is interconnected along its side edges with side walls 2 and 3 and at one end with the third transverse wall 10 and at the other end with a fourth transverse wall 17. If the device includes only one stage, liquid from the second receiver chamber may be discharged through wall 17 if desired via a suitable conduit not shown or may simply overflow the low wall 17.

If two stages are used as shown in the drawings, liquid is discharged from the second receiver chamber through orifice means 17a formed in wall 17 and then freely falls downwardly through entry chamber 18 having downwardly and inwardly inclined bottom panels 18a and 18b into vertically disposed downcomer conduit 19 and thence into pressure chamber 20 which is similar in construction to pressure chamber 12. Orifice means 17a may be similar to orifice means 6a. A fifth transverse wall 21 is interconnected along its side edges with side walls 2 and 3 and forms a part of the entry chamber 18.

Any excess liquid which flows into the second receiver chamber at a rate greater than can be accommodated by downcomer conduit 19 simply overflows the fifth transverse wall 21.

Vertically disposed riser conduit 21a communicates at its bottom end with pressure chamber 20 and its upper end extends through third bottom wall 22 which is connected along its side edges with side walls 2 and 3 and along one end edge with the fifth transverse wall 21 and along its other end edge with sixth transverse wall 23. Sixth transverse wall 23 also is interconnected along its side edges with side walls 2 and 3. The side walls 2 and 3 and the fifth and sixth transverse walls 21 and 23 define a third receiver chamber which is supplied with aerated liquid from riser conduit 21a and any excess liquid which overflows the fifth transverse wall 21 and discharges such liquid through the outlet conduit 24 which preferably is arranged to discharge the aerated effluent into a stream or lake.

From the above description it is apparent that the orifice plates such as 6 and 17 reduce pressure via venturi action which tends to aerate the liquid from atmosphere to some extent. Furthermore a free fall from the orifice means into the associated entry chamber and downcomer conduit tends to intermingle liquid with atmospheric air and to trap air which is carried downwardly through the downcomer conduits and is not allowed to escape upwardly due to the fact that the velocity of movement of liquid downwardly in the downcomer tubes is at least as great as is the velocity at which air tends to float upwardly in those tubes. Of course downward flow of liquid in the downcomer conduits coupled with the tendency of air to flow upwardly causes substantial intermingling and dissolution of oxygen in the liquid. As the liquid and air bubbles flow down the downcomer tubes, static pressure gradually increases and according to Henry's law, this increase in pressure facilitates dissolution of oxygen in the liquid. Of course the greater the length of the downcomer tubes the more oxygen is placed in solution because of increase flow time and of increased pressure due to increased head. The lower end of the downcomer tubes are placed near the bottom of their pressure compartments so as to trap air in the upper portions thereof and further to facilitate the application of pressure and to preclude the escape of air back up the downcomer tubes which can be dissolved as the flow of liquid proceeds.

Any excess air is vented to atmosphere through the open top head box from the vertically disposed riser conduits. With optimum design criteria, the final oxygen content depends upon the initial concentration of oxygen and the depth of the downcomer tubes which may vary depending on dissolved oxygen requirements or on the nature of the installation and the available head. The pressure chambers are primarily responsible for aeration under conditions of low flow rates. Where excessive flow rates occur, air is trapped in the downcomer conduits but is swept downwardly and not held in equilibrium so that efficiency of dissolution of oxygen is reduced.

For some applications of the invention it may not be necessary to utilize two phases as shown in FIG. 1. More specifically a device including downcomer conduit 11 and riser 15 together with pressure chamber 12 and parts associated therewith may suffice. In such a single phase device aerated liquid preferably is discharged through an aperture in wall 17 and a conduit such as 24. The addition of a second phase including orifice means 17a, entry chamber 18, downcomer conduit 19, riser conduit 21a, and pressure chamber 20 and parts associated therewith tends to increase the level of dissolved oxygen. As an example, and assuming required dissolved oxygen to be 5 milligrams per liter and the initial dissolved oxygen level to be .5 milligram per liter, one phase through orifice means 6a, downcomer conduit 11, pressure chamber 12 and riser 15 increases the dissolved oxygen by 3.6 milligrams per liter to give a final dissolved oxygen level of 4.1 milligrams per liter. At this level passing the water through the second stage including orifice means 17a, downcomer conduit 19, pressure chamber 20 and riser 21 and parts associated therewith provides an additional 1.9 milligrams per liter to result in a final dissolved oxygen level of 6 milligrams per liter which is well within usual requirements.

Obviously three or more stages could be used if desired and such additional stages could be constructed in a manner identical to those shown in the drawings.

While an aeration device constructed according to this invention normally is disposed so as to receive discharged effluent and then to discharge the aerated liquid into a stream or lake, it is possible to install the device in shallow streams and to utilize the fall of the stream to afford the necessary head.

The device may also be installed in deep streams, ponds or lakes in which event, the only power required is that necessary to drive a pump to lift water to the feed box and such power requirement is obviously minimal. A series of devices according to this invention may be employed to supply the high oxygen concentrations necessary to support a biological population used in conjunction with biological treatment systems. In such case, a series of devices such as that shown in FIG. 1 can be connected at levels which differ by a foot and a half to 2 feet and the necessary pumps required to lift the liquid to be treated may be powered at minimal cost.

Of course for ordinary oxidation situations, the device is feasible and operates with no power requirements and as such is not only reliable and not subject to break down since it has no moving parts but it is also quite economical not only to construct but also to maintain.

The embodiments of the invention in which an exclusive property or privilege is claimed are defined as follows:

1. A liquid aeration device comprising an open top head box having a bottom, a pair of spaced side walls interconnected with said bottom, and a pair of spaced transverse walls interconnected with said side walls and said bottom to form a receiver chamber, means associated with said receiver chamber for supplying liquid thereto to be aerated, at least one orifice formed in one transverse wall of said head box through which liquid flows at high velocity and which reduces the liquid pressure so as to effect aeration of the liquid directly from atmosphere, a vertically disposed downcomer conduit arranged with its upper end at a level somewhat below and downstream from said orifice for receiving free falling liquid flowing through said orifice, a gastight pressure chamber interconnected with the lower end of said downcomer conduit, and having only a vertically disposed riser conduit having its lower end interconnected with said pressure chamber and arranged with its upper end at a level below the upper end of said downcomer conduit for discharging aerated liquid, and said vertically disposed riser conduit being connected to the top of said pressure chamber and extending into said pressure chamber below the liquid level therein.

2. A device according to claim 1 wherein the cross-sectional area of said orifice is somewhat greater than the cross-sectional area of the inside of said downcomer conduit.

3. A device according to claim 1 wherein the cross-sectional area of said downcomer conduit is such that the downward velocity of liquid therein is at least as great as the velocity at which air bubbles tend to rise in said downcomer conduit.

4. A device according to claim 1 wherein a plurality of orifices are formed in said one transverse wall of said head box and wherein the total cross-sectional area thereof is somewhat greater than the cross-sectional area of the inside of said downcomer conduit.

5. A device according to claim 1 wherein a third transverse wall is interconnected with said walls and is disposed downstream from said one wall of said head box to form an entry chamber immediately above and in communication with the upper end of said downcomer conduit and to accommodate overflow of liquid whenever the rate at which liquid flows into said receiver chamber is greater than the rate at which liquid flows downwardly through said downcomer conduit.

6. A device according to claim 5 wherein a pair of downwardly inclined bottom panels are interconnected with said side walls respectively to form portions of the bottom of said entry chamber on opposite sides of the upper end of said downcomer conduit.

7. A device according to claim 1 wherein a second bottom wall is interconnected with said side walls at the level of the upper end of said riser conduit and wherein a fourth transverse wall is interconnected with said second bottom wall and with said side walls to form a second receiver chamber which is in communication with the upper end of said riser conduit and wherein orifice means is formed in said fourth transverse wall.

8. A device according to claim 7 wherein a second vertically disposed downcomer conduit is arranged with its upper end at a level below and downstream from said orifice means for receiving liquid flowing therethrough, a second pressure chamber is interconnected with the lower end of said second downcomer conduit, and a second vertically disposed riser conduit is interconnected at its lower end with said second pressure chamber and arranged with its upper end at a level below the upper end of said second downcomer conduit for discharging aerated liquid.

9. A device according to claim 8 wherein a fifth transverse wall is interconnected with said side walls to form a second entry chamber above and in communication with said second downcomer conduit and disposed downstream from said fourth transverse wall and to accommodate overflow of liquid from said orifice means which is in excess of that which flows downwardly through said second downcomer conduit.

10. A device according to claim 8 wherein said pressure chambers are comparable in size and wherein the lower ends of said downcomer and riser conduits extend through openings in the top walls of the associated pressure chambers respectively.

11. A device according to claim 8 wherein a third bottom wall is disposed at the level of the upper end of said second riser conduit and interconnected with said side walls and with said fifth transverse wall and having an opening through which the upper end of said second riser conduit extends to form a third receiver chamber, and wherein an outlet is formed in said third receiver chamber through which aerated liquid is discharged from the aeration device.

12. A device according to claim 1 wherein the lower ends of said downcomer and riser conduits are below the top of said pressure chamber so as to trap air in the upper portion of said pressure chamber.

* * * * *